Jan. 25, 1955 W. J. STINSON 2,700,223
COUNTERMECHANISM FOR PHOTOGRAPHIC CAMERAS
Filed March 10, 1953

INVENTOR.
WILLIAM J. STINSON
BY
ATTORNEY

United States Patent Office 2,700,223
Patented Jan. 25, 1955

2,700,223

COUNTER MECHANISM FOR PHOTOGRAPHIC CAMERAS

William J. Stinson, Rochester, N. Y., assignor to Graflex, Inc., Rochester, N. Y., a corporation of Delaware Application March 10, 1953, Serial No. 341,429

10 Claims. (Cl. 33—129)

The present invention relates to photographic cameras and more particularly to a counting mechanism for photographic cameras which will indicate the number of pictures taken or the number of exposures left on a roll of film.

On cameras using strip film without paper backing it is common practice to provide a counting or indicating mechanism of the type described. Usually the indicator is a dial which is driven by the film advancing mechanism. When a fresh roll of film is placed in the camera the counter dial is adjusted manually to an initial setting; and as exposure and advance of the film progress the dial is actuated to indicate at all times the number of exposures that have been taken or that are left to be taken on the film roll.

Since the film trailer has to be wound on the take-up roll after a roll of film has been exposed, and since the film leader has to be wound on the take-up roll before a new roll of film is in position for the first exposure, it would be a rare coincidence, when the counter dial is driven by the film advancing mechanism, to find the counter dial properly set after loading a fresh roll of film in the camera. Consequently it is usually necessary to change the relationship of the dial to the film advancing mechanism at this time. However, after the dial has been adjusted, it is imperative that the drive to the dial become operative again.

One conventional way of connecting the counter dial to the film advancing mechanism is by driving the dial from the film drive shaft through friction means such as a spring washer. During advance of the film the friction is sufficient to move the dial in time with the film advancing mechanism. To make the initial adjustment of the dial enough manual force is applied to the dial to overcome the friction and the dial is turned manually to its desired initial position.

This arrangement has, however, several inherent disadvantages. The counter dial must be near the film winding knob to avoid unnecessary complication in the drive to the counter dial. However, it not infrequently happens that in winding the film the dial setting is accidently disturbed which leads to incorrect indications. Also, in careless handling of the camera the counter dial may be moved. Disturbance of the counter-dial setting is particularly liable to occur, unless the photographer is very careful, because in conventional cameras of the type here under particular consideration the counter dial projects beyond the outside wall of the camera casing and so does the film winding knob. Because of manufacturing tolerances, also, the location of the dial with respect to the camera surface in the conventional camera is subject to undesirable variation. The dial is located by the film advancing shaft, while the external surface of the camera casing, to which the dial should fit closely, is located by other parts. This means that the counter dial in some instances may require shimming in assembly to clear the camera casing, and that in other cases it may project beyond the external surface of the camera casing leaving an undesirable and unsightly gap between the dial and the camera casing.

One object of the present invention is to provide a counter mechanism for photographic cameras which will be practically free from the liability of accidental disturbance.

Another object of the invention is to provide a counter mechanism which is self-locating with reference to the external surface of the camera.

Another object of the invention is to provide a counter mechanism which can be adjusted very easily manually for setting and without any substantial effort on the part of the photographer.

A further object of the invention is to provide a counter mechanism which is connected by a clutch with the film advancing mechanism and which can be uncoupled from the film-advancing mechanism simultaneously with rotation of the dial by simply pressing manually on the clutch member.

Other objects of the invention will be apparent hereinafter from the specification and from the recital of the appended claims.

Figure 1:
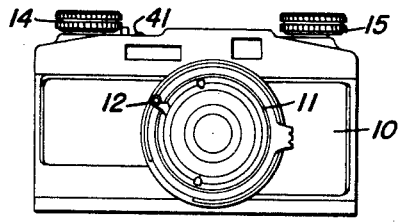
Fig. 1 is a front elevation of a camera equipped with a counter built according to one embodiment of this invention.
Figure 2:
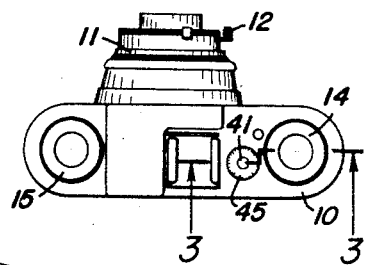
Fig. 2 is a plan view of this camera.
Figure 3:
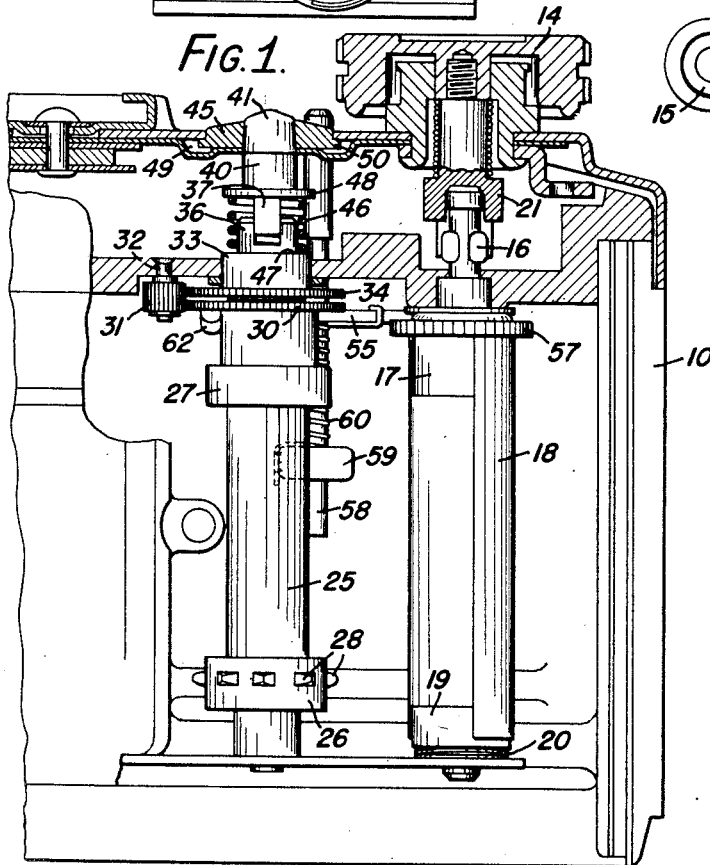
Fig. 3 is a fragmentary section on an enlarged scale taken on the line 3—3 of Fig. 2 looking in the direction of the arrows and showing a portion of the film transport mechanism, the counter mechanism and the drive connecting the counter dial with the film transport or metering shaft.

Referring now to the drawing by numerals of reference, 10 denotes the camera casing; 11 designates generally the objective lens mount of the camera; and 12 is the trigger for tripping the shutter to expose the film. The film is transported from a supply spool or cassette to a take-up roll; and the knurled knobs for manually rotating the wind or take-up roll and the rewind or supply roll are designated at 14 and 15, respectively. The wind or take-up shaft of the camera is denoted at 16. It is suitably journaled in the camera casing. It has a stub portion 17 integral with it that is of enlarged diameter and that has a pressed fit in one end of a sleeve or roll 18. This sleeve or roll has a pressed fit at its other end on a stub shaft 19 that is also journaled in the casing. The stub shaft 19 has a spring tension applied to it by a spring washer 20. Sleeve 18 is slotted axially in conventional manner to receive the lead end of a roll of film so that upon rotation of the sleeve film will be wound thereon.

The sleeve 18 is rotated by rotation of knob 14. This knob is threaded onto an axially slidable shaft or coupling member 21 that is adapted to be engaged with the upper end of shaft 16 to couple shaft 16 to the knob. The connection of knob 14 with the shaft 16 is conventional and forms no part of the present invention and so need not further be described here.

Journaled in the camera casing parallel to the take-up shaft 16 and sleeve 18 is a metering shaft 25. The shaft 25 is provided adjacent one end with a peripherally-toothed portion 26; and axially spaced from toothed portion 26 toward the other end of the shaft is a smooth bearing or supporting portion 27. The teeth 28 of toothed portion 26 are adapted to engage in the perforations along one lateral edge of the film used in the camera. The smooth bearing portion 27 supports the film strip adjacent its other lateral edge. Thus, as the film is wound up on the take-up sleeve or roll 18, the metering shaft 25 will be rotated in one direction through engagement of its teeth 26 with the film. Similarly when the exposed film is being rewound in the cassette by rotation of rewind knob 15, the metering shaft will be rotated in the opposite direction.

Fixedly secured to the shaft 25 is a spur gear 30. This gear meshes with a spur pinion 31 that is journaled on a stub shaft 32 mounted in the camera casing. Pinion 31 is a wide face pinion and meshes not only with gear 30 but also with a spur gear 34 that is secured to a stub shaft 33 journaled in the camera casing.

The gears 30 and 34 have different numbers of teeth, gear 30 having one tooth less or one tooth more than the gear 34. The stub shaft is coupled by a conventional coupling comprising a female member 36 and a male member 37 with a shaft 40 that has a conical upper end as denoted at 41. The tapered upper end 41 of the shaft 40 is adapted to engage in a correspondingly tapered hole in a counter button or dial 45 which has an external conical surface. A coil spring 46, which surrounds the upper end of the metering shaft, and which is interposed between a shoulder 47 on the stub shaft 33 and a collar 48 on the shaft 40, serves to constantly urge the tapered end 41 of shaft 40 into engagement with the counter button.

Figure 4:
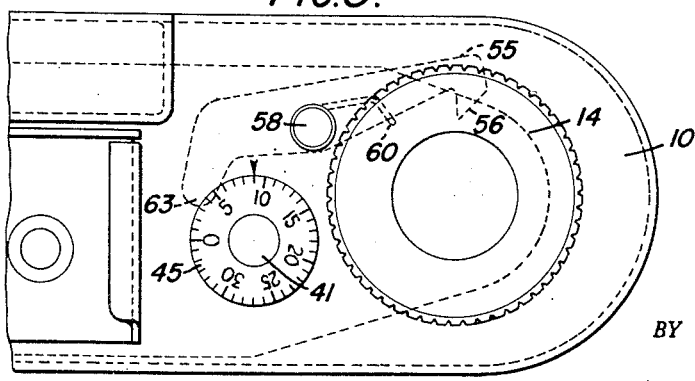
Fig. 4 is a plan view of the parts shown in Fig. 3.

The counter button or dial is graduated as shown in Fig. 4. It is mounted in a recess 49 in the camera casing so as to be out of the way and to be protected against accidental rotation. A circular flange 50 on the counter dial acts as a stop to limit outward movement of the counter and holds the counter dial axially so that the spring 46 will force the tapered end 41 of shaft 40 into engagement with the counter dial. The spring 46 acts, therefore, to maintain end 41 of shaft 40 in frictional driving engagement with the counter dial so that as the metering shaft 25 is rotated by film being wound on roll or sleeve 18, the shaft 40 will be rotated and in turn will rotate the counter dial. Because of the difference in tooth numbers of gears 30 and 34, the shaft 36 and the shaft 40 will be rotated a revolution plus a fraction of a turn, or a revolution less a fraction of a turn, for each revolution of shaft 25, depending on whether gear 34 has one tooth less or one tooth more than gear 30. The result is that the dial 45 will be advanced a graduation for each revolution of shaft 27.

A pawl lever 55 serves to stop rotation of shaft 25 after each revolution of the shaft. This lever has a dog 56 on one end that engages a ratchet wheel 57 that is secured to shaft 16. The lever is pivoted intermediate its ends on a rod 58 that is slidably mounted in the camera casing, being supported at its lower end in bearing lug 59. The lever is constantly urged away from ratchet wheel 57 by a spring 60 that is wrapped around pin 58 and that engages at one end with the lever and at its opposite end with lug 59. The lever is forced into engagement with the ratchet wheel 57, however, at the end of each revolution of metering shaft 25 by a cam lug 62 formed on shaft 25. This lug engages the tail 63 of the lever.

To disengage the lever from the ratchet wheel, when it is again desired to wind film on the take-up roll 18, the rod 58 is pushed inwardly against the resistance of spring 60 moving the dog 56 out of engagement with the ratchet wheel. Then the wind knob 14 is rotated causing the roll 18 to be rotated to wind on it the exposed film. As the film is wound up on roll 18, the film drives shaft 25 through teeth 28 which are engaged with the film. As shaft 25 rotates, its gear 30 drives pinion 31 which in turn drives gear 34, shaft 36, coupled shaft 40 and counter dial 45. The dial is therefore, advanced one graduation to indicate that another exposure has been made, or that one less exposure is left on the unused film. When the shaft 35 has made a revolution dog 56 is forced back into engagement with ratchet wheel 57 again by engagement of cam lug 62 with the tail 63 of lever 55. The shaft 16 is thus stopped from rotation, and the film advance is stopped.

Figure 5:
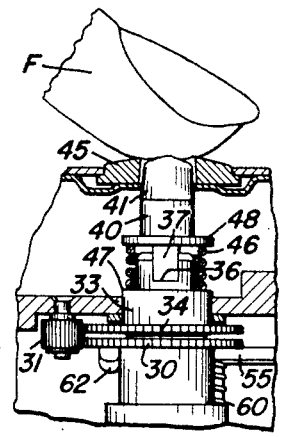
Fig. 5 is a fragmentary section taken also in the plane of Fig. 3 and illustrating diagrammatically the operation of setting the counter.

To set the counter dial, all that is required is to press with a finger, denoted at F, Fig. 5, on the outer end of shaft 40 to depress the shaft and push its end 41 out of engagement with the counter dial, which is then free to turn. The tapered upper end of the shaft 41 and the counter dial 45 are small enough so that the finger or thumb of the photographer can engage simultaneously the end of the shaft 40 and the counter dial. The photographer can, therefore, simultaneously push shaft 40 inwardly to disengage it from the counter dial, and rotate the counter dial to the desired setting. The slot and tongue coupling 36—37 allows the axial movement.

The recess 49, in which the counter button is mounted, is formed by a projection from the camera casing and limits the downward movement of the counter dial or button 45. The thrust of the spring 46 keeps the tapered end 41 of shaft 40 in the dial and drives the dial with the shaft by action of the tapered clutch when the tapered shaft is released and the take-up knob is rotated. The tapered shaft 40 being spring-loaded, the dial or button 45 is spring-loaded by thrust from the shaft. Moreover, it locates directly from the camera shell or casing.

While the invention has been described in connection with a specific embodiment thereof, it will be understood that it is capable of further modification; and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A photographic camera comprising a rotary film-metering shaft having peripheral teeth for engaging perforations in the film, a second shaft journaled in the camera coaxial with said metering shaft, a gear secured to said metering shaft, a rotatable pinion meshing with said gear, a second gear secured to said second shaft and meshing with said pinion, said gears having different numbers of teeth, a third shaft mounted coaxial with the second shaft and having a slidable clutch connection with said second shaft, and a graduated counter dial journaled in said camera coaxial with said shafts, means for limiting movement of said dial axially outward of said camera, said dial having a tapered conical bore, and said third shaft having a correspondingly tapered conical end to engage drivingly in said bore, and spring means constantly urging said third shaft axially in one direction into driving engagement with said dial.

2. A photographic camera comprising a casing, a rotary film-metering shaft journaled in said casing and having peripheral teeth for engaging perforations in the film, a second shaft journaled in said casing, means for driving said second shaft from said metering shaft, a drive member mounted coaxially of said second shaft and slidingly coupled to said second shaft, said casing having a pocket therein opening to the exterior, a graduated counter dial journaled in said pocket coaxially of said drive member and having a tapered conical bore, said drive member having a correspondingly tapered conical end to engage drivingly in said bore, spring means constantly urging said drive member into driving engagement with said dial, and means for limiting movement of the dial outwardly of said pocket.

3. A photographic camera comprising a casing, a rotary film-metering shaft journaled in said casing and having peripheral teeth for engaging perforations in the film, a second shaft journaled in said casing, means for driving said second shaft from said metering shaft, a drive member mounted coaxially of said second shaft and slidingly coupled to said second shaft, said casing having a pocket therein opening to the exterior, a graduated counter dial journaled in said pocket coaxially of said drive member and having a portion projecting externally therefrom and having a peripheral flange which engages with the outer wall of said pocket to prevent outward movement of said dial, the inner wall of said pocket engaging the inner side of said dial to prevent inward movement of said dial, said dial having a tapered conical bore, said drive member having a correspondingly tapered conical end to engage drivingly in said bore, and spring means constantly urging said drive member into driving engagement with said dial.

4. A photographic camera comprising a casing, a rotary film-metering shaft journaled in said casing and having peripheral teeth for engaging perforations in the film, a second shaft journaled in said casing, means for driving said second shaft from said metering shaft, comprising a gear secured to said metering shaft, a gear secured to said second shaft, and a pinion meshing with both gears, said gears having different numbers of teeth, a drive member mounted coaxially of said second shaft and slidingly coupled to said second shaft, said casing having a pocket therein opening to the exterior, a graduated counter dial journaled in said pocket coaxially of said drive member and having a portion projecting externally therefrom and having a peripheral flange which engages the outer wall of said pocket to prevent outward movement of said dial, the inner wall of said pocket engaging the inner side of said dial to prevent inward movement of said dial, said dial having a tapered conical bore, said drive member having a correspondingly tapered conical end to engage drivingly in said bore, and spring means constantly urging said drive member into driving engagement with said dial.

5. A photographic camera comprising a casing having a pocket therein, a graduated counter dial rotatably mounted in said pocket to be held thereby against axial movement, said counter dial having a tapered conical bore, an axially slidable drive member having a correspondingly tapered conical end adapted to be engaged drivingly with said bore to rotate said dial, and spring means constantly urging said drive member into driving engagement with said dial, said drive member when engaged with said dial projecting axially outwardly beyond said dial whereby it may be moved manually against said spring to disengage said drive member drivingly from said dial, a rotatable metering shaft journaled in said casing and having peripheral teeth to engage perforations in the film, whereby said shaft rotates on movement of the film, and means for driving said drive member from said metering shaft.

6. A photographic camera comprising a casing having a pocket therein, a generally flat, graduated counter dial rotatably mounted in said pocket to be held thereby against axial movement inwardly of said casing, said dial having a peripheral flange engaging the front wall of said pocket to prevent axial movement of the dial outwardly of said casing, the graduated portion of said dial extending outwardly of said pocket, said counter dial having a tapered conical bore, an axially slidable drive member having a correspondingly tapered conical end adapted to be engaged drivingly with said bore to rotate said dial, and spring means constantly urging said drive member into driving engagement with said dial, said drive member when engaged with said dial projecting axially outwardly beyond said dial whereby it may be moved manually against said spring to disengage said drive member drivingly from said dial, a rotatable metering shaft journaled in said casing and having peripheral teeth to engage perforations in the film, whereby said shaft rotates on movement of the film, and means for driving said drive member from said metering shaft.

7. A photographic camera comprising a rotatable take-up spool, means for rotating said spool to wind thereon exposed film, a metering shaft journaled for rotation about an axis parallel to the axis of said take-up spool, said metering shaft having peripheral teeth to engage perforations in the film, whereby said shaft rotates on movement of the film, a drive member, a graduated counter dial, means for driving said drive member from said metering shaft, spring means constantly urging said drive member into driving engagement with said dial, a stop member, and means carried by said metering shaft for moving said stop member into operative engagement with said spool to stop the rotation thereof when said metering shaft has made a revolution.

8. A photographic camera comprising a rotatable take-up spool, means for rotating said spool to wind thereon exposed film, a metering shaft journaled for rotation about an axis parallel to the axis of said take-up spool, said metering shaft having peripheral teeth to engage perforations in the film, whereby said shaft rotates on movement of the film, a drive member, a graduated counter dial, means for driving said drive member from said metering shaft, spring means constantly urging said drive member into driving engagement with said dial, a ratchet wheel secured to said spool, a double-armed lever mounted to pivot about an axias parallel to the axis of said spool, said lever having a hook at one end adapted to engage said ratchet wheel to hold said spool against rotation, a spring constantly urging said hook to disengaged position, a cam mounted on said metering shaft to engage the opposite end of said lever to move said hook into engagement with said ratchet wheel after said metering shaft has made a revolution, and means for manually moving said hook to disengaged position.

9. A photographic camera comprising a rotatable take-up spool, means for rotating said spool to wind thereon exposed film, a metering shaft journaled for rotation about an axis parallel to the axis of said take-up spool, said metering shaft having peripheral teeth to engage perforations in the film, whereby said shaft rotates on movement of the film, a drive member, a graduated counter dial, means for driving said drive member from said metering shaft, spring means constantly urging said drive member into driving engagement with said dial, a ratchet wheel secured to said spool, a double-armed lever mounted to pivot about an axis parallel to the axis of said spool, said lever having a hook at one end adapted to engage said ratchet wheel to hold said spool against rotation, a spring constantly urging said hook to disengaged position, a cam mounted on said metering shaft to engage the opposite end of said lever to move said hook into engagement with said ratchet wheel after said metering shaft has made a revolution, and means for moving said lever manually axially of its pivotal axis to disengage said hook from said ratchet wheel.

10. A photographic camera comprising a casing, a rotatable take-up spool journaled in said casing, means for rotating said spool to wind film thereon, a film-metering shaft journaled in said casing for rotation about an axis parallel to the axis of said take-up spool, said metering shaft having peripheral teeth to engage perforations in the film, whereby said shaft rotates on movement of the film, a second shaft journaled in said casing coaxially of said metering shaft, means driving said second shaft from said metering shaft but at a different rate, a drive member mounted in said casing coaxially of said second shaft, a sliding coupling connecting said drive member to said second shaft, a graduated counter mounted in a pocket in said casing coaxial with said drive member, said counter having a tapered, conical bore, said drive member having a correspondingly tapered conical end engageable with said bore, spring means constantly urging said drive member into engagement with said counter, said drive member when engaged with said counter projecting outwardly beyond the outer surface of said counter whereby it may be manually pushed axially against the action of said spring to disengage it from said counter to permit adjustment of said counter independently of said drive member, the dimensions of the projecting end of the drive member and of said counter being such that pressure of a thumb may disengage the drive member and rotate said counter, means for locking said spool against rotation, means carried by said metering shaft for moving said locking means to operative position after a predetermined rotary movement of the metering shaft, means for constantly urging said locking means to disengaged position, and separate means for manually moving said locking means to disengaged position.

References Cited in the file of this patent

UNITED STATES PATENTS

| Number | Name | Date |
|---|---|---|
| 902,022 | Sturtevant | Oct. 27, 1908 |
| 1,493,334 | Fielding | May 6, 1924 |
| 1,944,038 | Sweet | Jan. 16, 1934 |
| 1,974,758 | Spray | Sept. 25, 1934 |
| 2,289,827 | Crumrine | July 14, 1942 |
| 2,294,250 | Sperry | Aug. 25, 1942 |
| 2,358,327 | Harris | Sept. 19, 1944 |
| 2,563,811 | Barnes | Aug. 14, 1951 |